United States Patent [19]

Ruegg

[11] Patent Number: 5,674,033
[45] Date of Patent: Oct. 7, 1997

[54] VEHICLE TIE-DOWN SYSTEM FOR CONTAINER

[76] Inventor: Thomas Arthur Ruegg, Kitchell Rd., Convent Station, N.J. 07961

[21] Appl. No.: 435,597

[22] Filed: May 5, 1995

[51] Int. Cl.⁶ .................................................. B60P 7/08
[52] U.S. Cl. .................. 410/104; 410/101; 410/8; 410/12; 410/21; 410/23; 410/30; 410/49
[58] Field of Search .................................... 410/104, 101, 410/96, 97, 100, 103, 105, 4, 8–12, 21, 23, 30, 49, 50; 248/499; 24/115 K, 265 CD; 411/182–184, 189, 431, 432; 188/32

[56] References Cited

U.S. PATENT DOCUMENTS

| | | | |
|---|---|---|---|
| 1,780,282 | 11/1930 | Tucker | 410/9 |
| 3,353,780 | 11/1967 | Young | 410/104 |
| 3,877,671 | 4/1975 | Underwood et al. | 410/104 X |
| 3,972,500 | 8/1976 | Johnson et al. | 410/104 X |
| 4,496,271 | 1/1985 | Spinosa et al. | 410/105 |
| 5,137,405 | 8/1992 | Klein | 410/104 X |
| 5,454,675 | 10/1995 | DeHaitre | 411/432 X |

FOREIGN PATENT DOCUMENTS

| | | | |
|---|---|---|---|
| 2675422A1 | 10/1992 | France | 410/104 |
| 2064047A | 6/1981 | United Kingdom | 411/189 |

Primary Examiner—Karen B. Merritt
Assistant Examiner—Stephen Gordon
Attorney, Agent, or Firm—Rohm & Monsanto

[57] ABSTRACT

A system for securing a vehicle of the type having a plurality of wheels from rolling or sliding along the floor of a refrigerated-type cargo container, employs lashing point anchors which couple to the floor of the cargo container without damaging same. Generally, the floors of refrigerated-type cargo containers are delicate, as they are formed of a plurality of elongated floor sections formed of extruded aluminum. The floor sections are arranged parallel to, and at a predetermined inter-sectional distance from, one another, each elongated floor section having a horizontal top portion and a vertical portion arranged orthogonal to one another to form a T-shaped cross-sectional configuration. A plurality of lashing straps, each having first and second ends, are coupled between the vehicle and respective ones of the lashing point anchors. Each lashing strap has an associated length adjustment arrangement. The lashing point anchors are in the form of assemblies that are removably coupled with the floor of the refrigerated-type cargo container and have first and second lashing point assembly portions whereby when the lashing point assembly is coupled to the floor of the refrigerated-type cargo container, at least a portion of the horizontal top portion of the one of the elongated floor sections is interposed between the first and second lashing point assembly portions.

7 Claims, 5 Drawing Sheets

5,674,033

VEHICLE TIE-DOWN SYSTEM FOR CONTAINER

BACKGROUND OF THE INVENTION

1. Field of the Invention

This invention relates generally to systems for securing vehicles during transit, and more particularly, to a system for tieing down a vehicle which is transported in a refrigerated-type cargo container.

2. Description of the Related Art

It is a general problem in the shipping industry that cargo containers, which typically have a length of 40 feet or more, are shipped in one direction substantially full of cargo but are returned empty. The problem is particularly acute with respect to special purpose containers, such as refrigerated containers. Such containers generally have a special floor on the interior thereof that facilitates the flow of refrigerated air underneath the cargo. More specifically, the floor of the interior of such refrigerated containers is formed of rather delicate parallel extruded T-sections, whereby the cargo will rest on top of each such T-section, but the voids between such sections permit the refrigerated air to communicate with the underside of the cargo. This prevents the bottom surface of the cargo from becoming too warm either from lack of communication with the refrigerated air, or from thermal conduction between the cargo and the container floor.

As stated, the floor of the refrigerated cargo containers is rather delicate. Generally, the T-sections are formed of extruded aluminum and it is desirable that they be rather thin cross-sectionally. A thin cross-section not only reduces thermal conduction from the floor to the cargo container but also increases the volume of the inter-sectional voids whereby the refrigerated air is more easily passed therebetween.

There is a need to ship vehicles, such as automobiles and trucks, in refrigerated containers, particularly if they would otherwise be returned empty. The vehicles must be securely latched down during transit, but there is not available in the art an inexpensive arrangement for securing the vehicles in the containers without damaging the delicate aluminum extrusions which form the container floors.

It is, therefore, an object of this invention to provide a simple and inexpensive arrangement for tieing down or otherwise securing a vehicle to a refrigerated-type cargo container which will not damage the cargo container floor.

It is another object of this invention to provide a vehicle secure-down arrangement which can be employed to prevent the vehicle from rolling or shifting in position during transit in a refrigerated-type cargo container.

It is also an object of this invention to provide a vehicle lashing system which will not loosen upon being subjected to vibration during transit.

It is a further object of this invention to provide a tie-down arrangement for heavy articles transported in a refrigerated-type cargo container.

SUMMARY OF THE INVENTION

The foregoing and other objects are achieved by this invention which provides an arrangement for securing an article to a floor of a refrigerated-type cargo container. The floor in such a cargo container is formed of a plurality of elongated floor sections arranged parallel to one another, and at a predetermined inter-sectional distance from one another. Each such elongated floor section has a horizontal top portion and a vertical portion arranged orthogonal to one another so as to form a T-shaped cross-sectional configuration. The vertical portion has a predetermined height dimension. In accordance with the invention, there is provided an elongated bar having a width dimension which is less than the inter-sectional distance between the top portions of adjacent ones of the elongated floor sections. The elongated bar has a depth dimension which is less than a predetermined height dimension of the vertical portion. Thus, the elongated bar can be passed between adjacent ones of the elongated floor sections, and can be accommodated beneath their respective top portions. A coupling arrangement is engaged with the elongated bar, and when the elongated bar is disposed beneath the respective top portions of the adjacent elongated floor sections, the coupling arrangement extends upward above the top portions for engaging with the article to be secured to the floor. A tightening arrangement engages with the coupling arrangement and urges forcefully the elongated bar towards the article to be secured to the floor. Portions of the horizontal top portions of adjacent ones of the elongated floor sections are interposed between the elongated bar and the article to be secured to the floor.

In one embodiment of the invention, the coupling arrangement is fixed onto the elongated bar, and may be provided with a threaded member which is arranged to extend through an aperture of the article to be secured to the floor. The tightening arrangement, in such an embodiment of the invention, includes a threaded nut which engages with the threaded member. In a further embodiment of the invention, the threaded nut may be provided with an elastic portion for communicating with the threaded member of the coupling arrangement so as to prevent a loosening thereof in response to vibration. In a further embodiment of the invention, the article which is intended to be secured to the floor is a lashing point, which may be adapted to engage with a conventional tie-down lashing strap. In other embodiments, the article to be secured to the floor is a wheel chock which is arranged near the wheel of a vehicle to be transported to prevent same from rolling in the container.

In accordance with a further aspect of the invention, a system is provided for securing a vehicle of the type having a plurality of wheels from rolling or sliding along the floor of a refrigerated-type cargo container. As previously indicated, the floor of the cargo container is of the type which is formed of a plurality of elongated floor sections arranged parallel to, and as a predetermined inter-sectional distance from one another. Each such elongated floor section has a horizontal top portion and a vertical portion arranged orthogonal to one another to form a T-shaped cross-sectional configuration. In accordance with the invention, a plurality of lashing straps is provided, each lashing strap having first and second ends. Each of the lashing straps is coupled at a first end thereof to the vehicle. Additionally, each such lashing strap is provided with an associated length adjustment arrangement which may include, in some embodiments of the invention, a tensioning device. Further in accordance with the invention, a plurality of lashing point assemblies are coupled removably with the floor of the refrigerator-type cargo container. The second ends of the lashing straps are connected to respective ones of the lashing point assemblies. Each lashing point assembly is formed of first and second lashing point assembly portions, and are configured such that when the lashing point assemblies are coupled to the floor of the refrigerator-type cargo container, at least a portion of the horizontal top portion of an elongated floor section is interposed between the first and second lashing point assembly portions.

In accordance with a specific embodiment of this further aspect of the invention, the second ends of the lashing straps are coupled to respective first lashing point assembly portions. In this embodiment, the second lashing point assembly portion is formed of an elongated bar having a width dimension which is less than the inter-sectional distance between the top portions of adjacent ones of the elongated floor sections, and a depth dimension which is less than the predetermined height dimension of the vertical portion. Thus, as previously indicated, the elongated bar can be accommodated between an adjacent pair of the elongated floor sections beneath their respective top portions. In a particularly advantageous embodiment of the invention, the elongated bar has angled ends for increasing the length of the communication between the elongated bar and the underside of the horizontal top portions of the elongated floor section.

In a further embodiment of the further aspect of the invention, the system is provided with a wheel chock assembly which is coupled removably with the floor of the refrigerated-type cargo container. The wheel chock assembly is formed of first and second wheel chock assembly portions which, when coupled to the floor, include a portion of the horizontal top portion of at least one of the elongated floor sections therebetween. In a still further embodiment, the first wheel chock assembly portion is arranged to be in communication with a wheel of a vehicle, and the second wheel chock assembly portion is formed of an elongated bar, as previously described. The first wheel chock assembly portion may be formed of a chock block, and in some embodiments may be but a piece of lumber.

As previously stated, the length adjustment arrangements which are installed on the respective lashing straps can, in some embodiments, include a tensioning arrangement for producing a tensile load on each of the lashing straps. This will facilitate the placing of a load on the wheels and suspension of the vehicle being transported, and will limit bouncing and other displacement of the vehicle which may occur during transit. It is desirable that the tensioning arrangement be secured to preclude unintentional release of the tensile load. This may be achieved with the use of conventional cable ties securing the handle of the tensioning arrangement.

In accordance with a further aspect of the invention, there is provided a lashing point assembly for forming a cargo lashing point on the floor of a refrigerated-type cargo container. In accordance with the invention, a lashing point anchor is formed having a base portion for communicating with the floor of the cargo container and a coupling portion which may be formed integrally with the base portion for facilitating coupling of the lashing strap thereto. An elongated bar, as previously described, is provided with a coupling arrangement engaged therewith extending upward above the top portions of the adjacent pair of the floor sections and engaging with the base portion of the lashing point anchor. A tightening arrangement urges the elongated bar means and the base portion forcefully toward one another, with portions of the horizontal top portions of the adjacent elongated floor sections being interposed between the elongated bar and the base portion of the lashing point anchor.

In a highly advantageous embodiment of the invention, the elongated bar is provided with angled end portions, as previously described, for increasing the communication between the elongated bar and the underside of the horizontal top portion of the elongated floor section. Additionally, the coupling arrangement is fixed onto the elongated bar such that rotation thereof results in rotation of the elongated bar beneath the horizontal portions of the elongated floor sections. Thus, the tightening of the tightening arrangement, which may include a friction element for preventing loosening, urges the angled ends of the elongated bar toward the vertical portions of the elongated floor sections, ensuring maximization of the extent of communication between the elongated bar and the underside of the horizontal top portion of the elongated floor section.

BRIEF DESCRIPTION OF THE DRAWING

Comprehension of the invention is facilitated by reading the following detailed description, in conjunction with the annexed drawing, in which.

DETAILED DESCRIPTION

Figure 1:
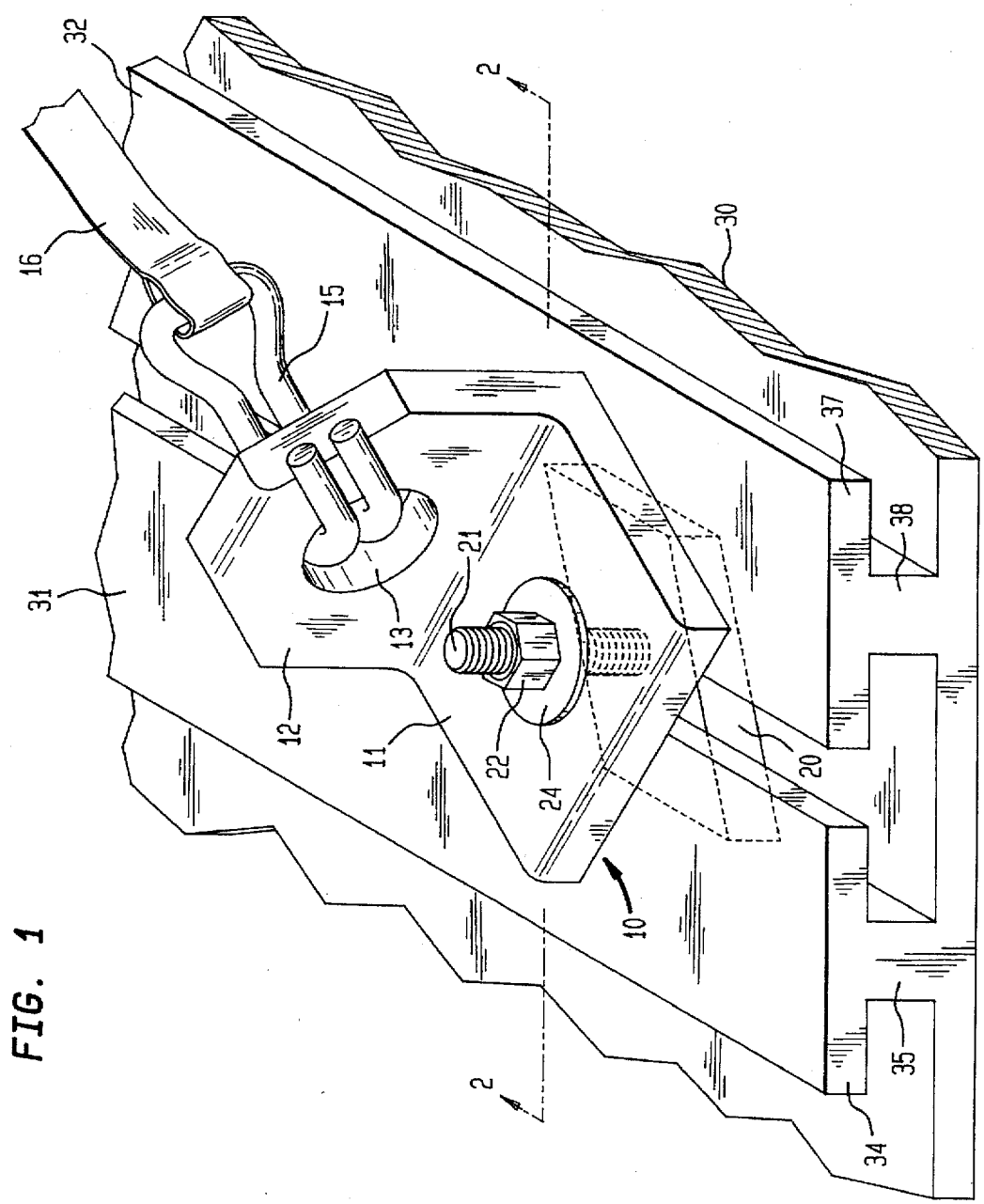
FIG. 1 is an isometric representation of a specific illustrative embodiment of the invention showing a lashing strap anchor coupled to the floor of a refrigerated-type cargo container.

FIG. 1 is an isometric representation of a specific illustrative embodiment of the invention. As shown, a lashing point anchor 10 is formed of a base portion 11 and a coupling portion 12. Coupling portion 12 has an aperture 13 therethrough for accommodating a hook 15 to which is coupled a lashing strap 16.

An elongated bar 20 is shown to have a coupling arrangement in the form of a threaded member 21 coupled thereto. Threaded member 21, as will be shown hereinbelow, may be in the form of a bolt. The threaded member extends through an aperture (not shown in this figure) in base portion 11 of the lashing point anchor, and has a nut 22 threadedly engaged therewith. In this embodiment, a washer 24 is installed on threaded number 21 and interposed between nut 22 and base portion 11.

FIG. 1 additionally shows a floor 30 which is of a type that is provided in refrigerated-type cargo containers (not shown in this figure). Floor 30 is provided with a pair of elongated floor sections 31 and 32, each of which is shown to have a T-shaped cross-sectional configuration. More specifically, elongated floor section 31 has a horizontal top portion 34 and a vertical portion 35 which are orthogonal to one another so as to form the T-shaped configuration. Similarly, elongated floor section 32 has a horizontal top portion 37 and an associated vertical portion 38.

Elongated bar 20 has a width dimension which is smaller than the distance between horizontal top portions 34 and 37. In addition, the elongated bar has a depth, or thickness, dimension which is less than the height of vertical portions 35 and 38. Thus, the elongated bar can be accommodated in the void between the vertical portions and beneath the horizontal portions of elongated floor sections 31 and 32.

As shown, after the elongated bar has been entered into the void by passage between horizontal top portions 34 and 37, the elongated bar is rotated so that its end communicates with the respective vertical portions 35 and 38. Thus, as nut 22 is tightened onto the threaded member 21, base portion 11 and elongated bar 20 are forcefully urged toward one another, and portions of horizontal top portions of 34 and 37 are interposed therebetween.

Figure 2:
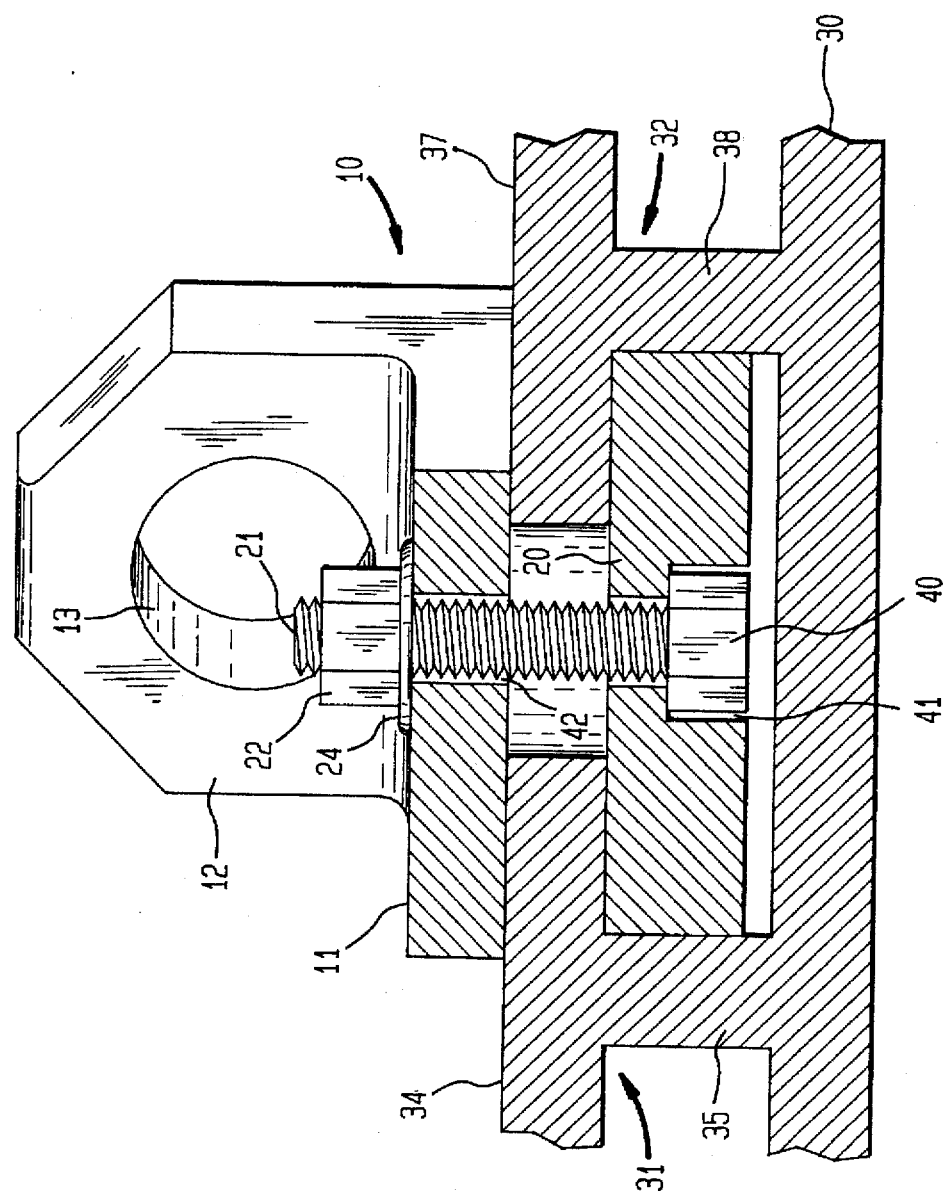
FIG. 2 is a partially cross-sectional representation of the embodiment of FIG. 1 taken along cross-section line 2—2 of FIG. 1.

FIG. 2 is a partially cross-sectional representation of the embodiment of FIG. 1. As shown, threaded member 21 is in the form of a bolt having a bolt head 40 disposed in a counter bore 41 in the underside of elongated bar 20. In a preferred embodiment of the invention, counter bore 41 is dimensioned slightly smaller than bolt head 40 so as to achieve an interference fit. Thus, bolt head 40 will not rotate within counter bore 41 as nut 22 is tightened onto threaded member 21.

FIG. 2 additionally shows that threaded member 21 extends through an aperture 42 through base portion 11 of the lashing point anchor. It is clearly seen in this cross-sectional representation that, as nut 22 is tightened, base portion 11 and elongated bar 20 are urged toward one another with portions of horizontal top portions 34 and 37 interposed therebetween. The tightening of nut 22, therefore, secures the lashing point anchor to a predetermined location on the floor of the refrigerated-type cargo container (not shown), while distributing the load over a rather large portion of the elongated floor sections. This ensures that the elongated floor sections, which may be formed of extruded aluminum, do not break or otherwise become damaged.

Figure 3:
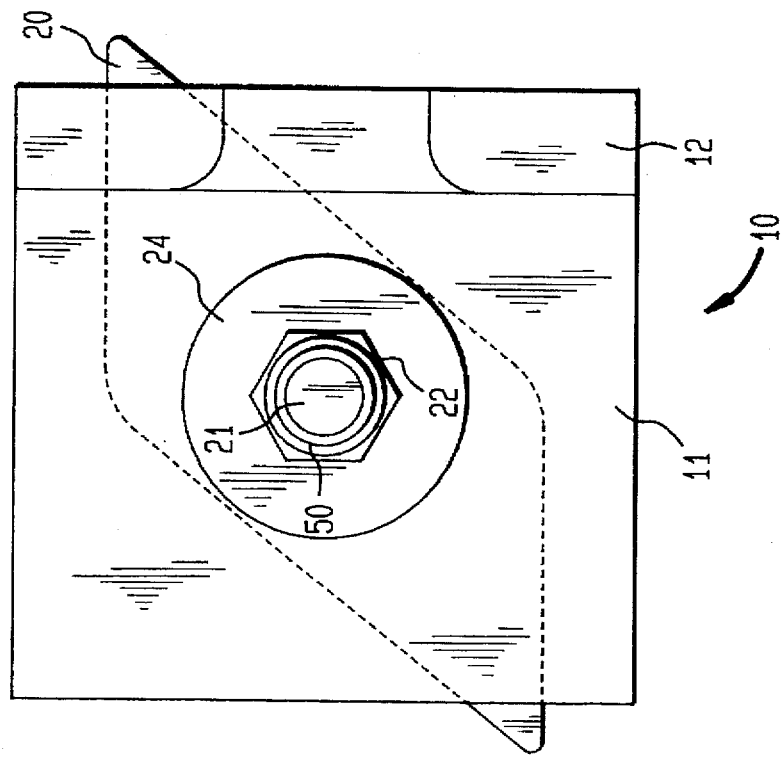
FIG. 3 is a partially phantom top view of the cargo lashing anchor shown in FIG. 1.

FIG. 3 is a partially phantom top view of lashing point anchor 10 showing the size relationship between the lashing point anchor and the elongated bar, in the specific illustrative embodiment of FIGS. 1 and 2. Corresponding elements of structure are similarly designated. In this illustration, nut 22 is provided with an insert 50 which may be formed of a resilient material. The resilient material communicates with threaded member 21 so as to produce a friction fit which prevents the nut from loosening in response to vibration during transit.

Figure 4:
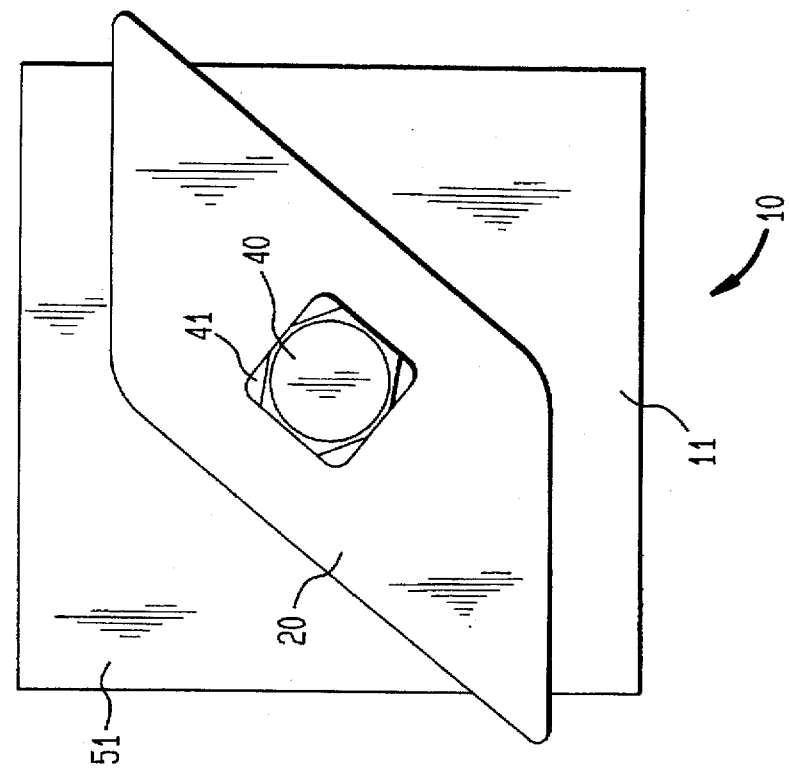
FIG. 4 is a bottom view of the cargo lashing anchor.

FIG. 4 is a plan view of lashing point anchor 10 showing the bottom surface 51 of base portion 11 of the lashing point anchor. This figure shows bolt head 40 arranged in counter bore 41, the counter borer having a substantially rectangular configuration. In this embodiment, bolt head 40 is press fit into counter bore 41.

In the illustrations of FIGS. 1, 3, and 4, base portion 11 is shown to have a substantially rectangular configuration. It is to be understood that persons of skill in the art can configure the general shape of the lashing point anchor, without departing from the claimed invention.

Figure 5:
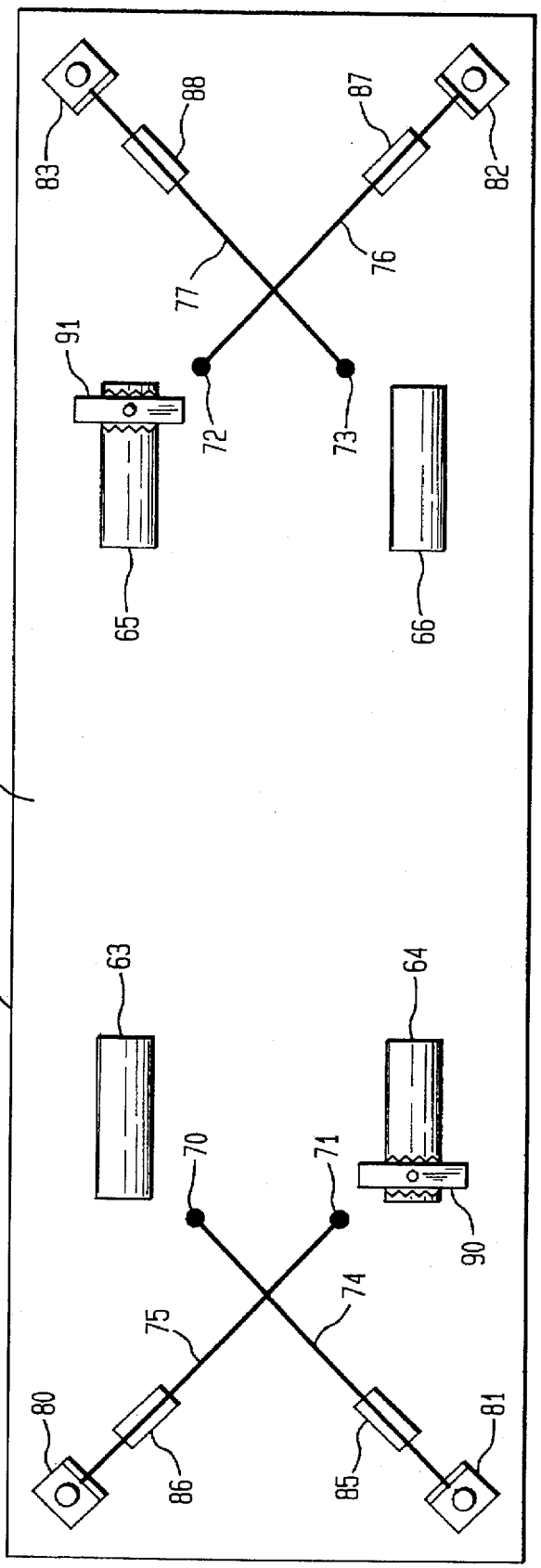
FIG. 5 is a schematic representation of a system configured in accordance with the principles of the invention for tieing down a vehicle.

FIG. 5 is a schematic representation of a specific illustrative system embodiment of the invention. More specifically, a refrigerated-type cargo container 60 has a floor 61 formed of a plurality of elongated floor sections, as described hereinabove with respect to FIG. 1. A vehicle (not specifically shown) is of a type having four wheels, 63, 64, 65, and 66. The vehicle is of a type having lashing points, 70, 71, 72, and 73, which may be in the form of conventional hooks or holes in the chassis side rails (not shown) of the vehicle.

Lashing straps 74, 75, 76, and 77 are coupled at respective ends thereof to associated ones of lashing points 70, 71, 72, and 73. The distal ends of the lashing straps are coupled to respective ones of lashing point anchors 80, 81, 82, and 83. The lashing point anchors may be configured as described hereinabove.

As shown in this figure, the lashing straps are arranged to cross one another at opposite ends of the vehicle. Thus, lashing strap 74 crosses lashing strap 75, and lashing strap 76 crosses lashing strap 77. Each such lashing strap is provided with a respectively associated one of tensioning arrangements 85, 86, 87, and 88. The tensioning arrangements may be of the conventional ratchet type, and are tightened until a sufficient load is placed on the vehicle suspension (not shown) so as to prevent the vehicle from bouncing and shifting during transit.

In this embodiment, wheels 64 and 65 of the vehicle are provided with chock assemblies 90 and 91.

Figure 6:
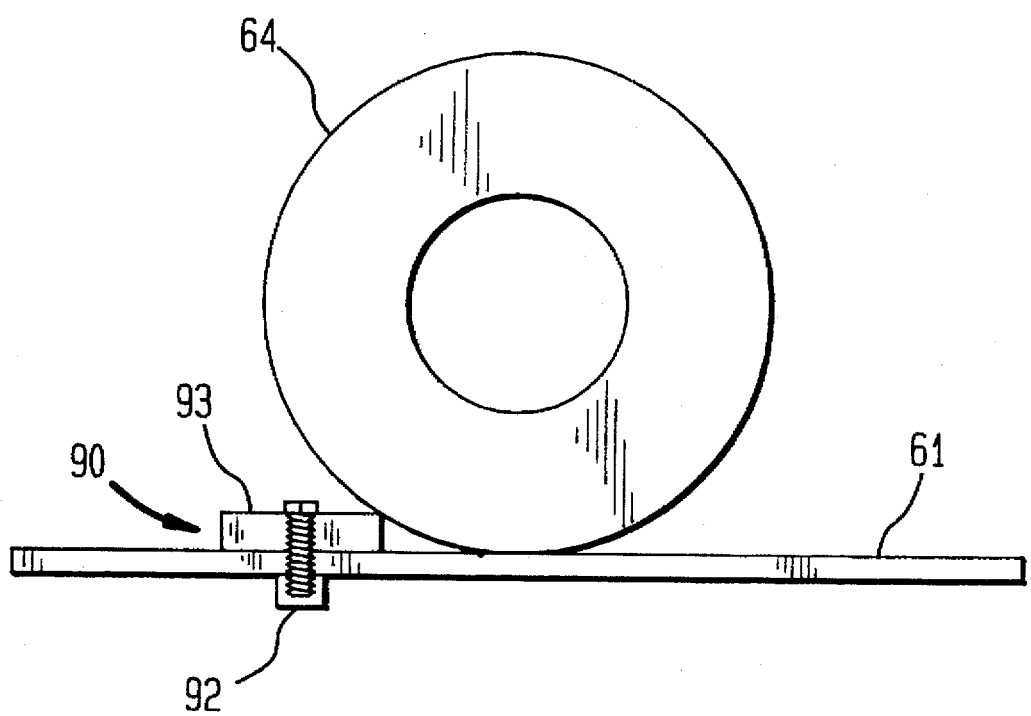
FIG. 6 is a schematic side view of a vehicle wheel disposed adjacent to a wheel chock, in accordance with the invention.

FIG. 6 is a schematic illustration of a wheel of the vehicle, such as wheel 64, shown to be adjoining wheel chock assembly 90. In this embodiment, the wheel chock assembly may be formed of a chock block 93, which may be, in certain embodiments of the invention, a block of wood. Chock block 93 is coupled to an elongated bar 92, having a coupling arrangement affixed thereto, as described in FIGS. 1–4.

When it is desired to secure the vehicle as shown in FIG. 5, the following steps are performed to ensure security.

1. Lock the steering wheel in a straight position, with the transmission in gear or in the "park" position;
2. Apply the emergency brake hard;
3. Install a wheel chock assembly (91) in front of the left front wheel (65), and a further wheel chock assembly (90) behind the right rear wheel (64);
4. Secure two lashing point anchors (82, 83) approximately five feet in front of the front axle of the vehicle and close to the sidewalls of the container;
5. Secure two lashing point anchors (80, 81) approximately five feet behind the rear axle of the vehicle and close to the side walls of the cargo container;
6. Attach the hooks of the lashing straps to the lashing points of the vehicles, such as holes into the frame rails;
7. Cross the vehicle lashing straps and secure the opposite ends of same to diagonally located lashing point anchors;
8. Tighten the lashing straps at the front of the vehicle evenly so as to place a load on the tires and suspension;
9. Reset the rear wheel chock, if necessary;
10. Tighten the rear vehicle lashing straps evenly to load the rear tires and suspension; and
11. Secure the handles of the tensioning arrangements with cable ties.

Although the invention has been described in terms of specific embodiments and applications, persons skilled in the art can, in light of this teaching, generate additional embodiments without exceeding the scope or departing from the spirit of the claimed invention. Accordingly, it is to be understood that the drawing and description in this disclosure are proffered to facilitate comprehension of the invention, and should not be construed to limit the scope thereof.

What is claimed is:

1. An arrangement for securing an article to a floor of a refrigerated-type cargo container, the floor being of the type formed of a plurality of elongated floor sections arranged parallel to, and at a predetermined inter-sectional distance from, one another, each elongated floor section having a horizontal top portion and a vertical portion arranged orthogonal to one another to form a T-shaped cross-sectional configuration, the vertical portion having a predetermined height dimension, the arrangement comprising:

elongated bar means having a width dimension which is less than the inter-sectional distance between the top portions of adjacent ones of the elongated floor sections and a depth dimension which is less than the predetermined height dimension of the vertical portion, whereby said elongated bar means can be accommodated between an adjacent pair of the elongated floor sections beneath their respective top portions, said elongated bar means being provided with angled end portions for increasing the length of the communication between said elongated bar means and the underside of the horizontal top portion of the elongated floor section;

coupling means fixedly engaged with said elongated bar means, said coupling means extending upward above the top portions of the adjacent pair of the floor sections when said elongated bar means is disposed therebetween for engaging with the article;

tightening means for urging forcefully said elongated bar means toward the article to be secured to the floor, whereby portions of the horizontal top portions of adjacent ones of the elongated floor sections maybe interposed between said elongated bar means and the article to be secured to the floor, and friction means coupled to said tightening means for preventing loosening of said tightening means in response to vibration and rotatively urging said angled end portions into communication with the vertical portions of respective ones of the elongated floor sections as said tightening means is tightened.

2. The arrangement of claim 1, wherein the article to be secured to the floor is a wheel chock.

3. The arrangement of claim 1, wherein said coupling means comprises a threaded member which is arranged to extend through an aperture of the article to be secured to the floor.

4. The arrangement of claim 3, wherein said tightening means comprises a threaded nut for threadedly engaging with said threaded member.

5. The arrangement of claim 4, wherein said friction means comprises an elastic portion for communicating with said threaded member of said coupling means.

6. The arrangement of claim 1, wherein the article to be secured to the floor is a lashing point.

7. A lashing point assembly for forming a cargo lashing point on the floor of a refrigerated-type cargo container, the floor being of the type formed of a plurality of elongated floor sections arranged parallel to, and at a predetermined inter-sectional distance from, one another, each elongated floor section having a horizontal top portion and a vertical portion arranged orthogonal to one another to form a T-shaped cross-sectional configuration, the vertical portion having a predetermined height dimension, the lashing point assembly comprising:

a lashing point anchor having a base portion for communicating with the floor of the refrigerated-type cargo container, and a coupling portion formed integrally with said base portion for facilitating coupling of a lashing strap thereto;

elongated bar means having a width dimension that is less than the inter-sectional distance between the top portions of adjacent ones of the elongated floor sections and a depth dimension which is less than the predetermined height dimension of the vertical portion, whereby said elongated bar means can be accommodated between an adjacent pair of the elongated floor sections beneath their respective top portions, said elongated bar means being provided with angled end portions for increasing the length of the communication between said elongated bar means and the underside of the horizontal top portion of the elongated floor section;

coupling means engaged with said elongated bar means, said coupling means extending upward above the top portions of the adjacent pair of the floor sections when said elongated bar means is disposed therebetween for engaging with the base portion of said lashing point anchor, said coupling means being fixed onto said elongated bar means, whereby rotation of said coupling means rotates said elongated bar means; and tightening means for urging forcefully said elongated bar means toward said base portion of said lashing point anchor, whereby portions of the horizontal top portions of adjacent ones of the elongated floor sections maybe interposed between said elongated bar means and said base portion of said lashing point anchor, said tightening means being further provided with friction means for preventing loosening of said tightening means in response to vibration and for rotatively urging the angled end portions of said elongated bar means into communication with the vertical portions of respective ones of the elongated floor sections as said tightening means is tightened.

* * * * *